(12) United States Patent
Wang et al.

(10) Patent No.: US 12,338,148 B2
(45) Date of Patent: Jun. 24, 2025

(54) METHOD FOR DEEP TREATMENT OF HOUSEHOLD WASTE LEACHATE BY BIOCHEMICAL PROCESS

(71) Applicants: Shanghai Environmental & Sanitary Engineering Design Institute Co., Ltd., Shanghai (CN); Ruoshui (Shanghai) Environmental Technology Co., Ltd., Shanghai (CN)

(72) Inventors: Shengdong Wang, Shanghai (CN); Jun Tai, Shanghai (CN); Zhenwei Xu, Shanghai (CN); Wentao Luo, Shanghai (CN); Li Wang, Shanghai (CN); Qiujun Yao, Shanghai (CN)

(73) Assignees: Shanghai Environmental & Sanitary Engineering Design Institute Co., Ltd., Shanghai (CN); Ruoshui (Shanghai) Environmental Technology Co., Ltd., Shanghai (CN)

( * ) Notice: Subject to any disclaimer, the term of this patent is extended or adjusted under 35 U.S.C. 154(b) by 451 days.

(21) Appl. No.: 17/823,577

(22) Filed: Aug. 31, 2022

(65) Prior Publication Data
US 2023/0002262 A1    Jan. 5, 2023

(30) Foreign Application Priority Data
Jul. 1, 2021    (CN) .......................... 202110734977.6

(51) Int. Cl.
*C02F 3/30*    (2023.01)
*C02F 3/12*    (2023.01)
(Continued)

(52) U.S. Cl.
CPC ............ *C02F 3/303* (2013.01); *C02F 3/1268* (2013.01); *C02F 3/305* (2013.01); *C02F 3/341* (2013.01);
(Continued)

(58) Field of Classification Search
CPC ........ C02F 3/303; C02F 3/1268; C02F 3/305; C02F 3/341; C02F 3/302; C02F 11/12;
(Continued)

(56) References Cited

FOREIGN PATENT DOCUMENTS

| CN | 109052827 A | * | 12/2018 | |
|---|---|---|---|---|
| CN | 111018234 A | * | 4/2020 | ................ C02F 9/00 |
| CN | 111138044 A | * | 5/2020 | |
| CN | 111499133 A | * | 8/2020 | .............. C02F 11/02 |
| KR | 20110088840 A | * | 8/2011 | |

OTHER PUBLICATIONS

Machine-generated English translation of CN 111499133, generated on Jan. 20, 2025.*
Machine-generated English translation of KR 20110088840, generated on Jan. 20, 2025.*
(Continued)

*Primary Examiner* — Fred Prince
(74) *Attorney, Agent, or Firm* — Emerson Thomson Bennett®, LLC; Daniel A. Thomson

(57) ABSTRACT

A method for deep treatment of household waste leachate by a biochemical process is provided, including: arranging one anoxic tank and two aerobic tanks in series; introducing the household waste leachate into the primary anoxic reactor, and diluting the household waste leachate to an concentration acceptable to microorganisms; introducing the diluted household waste leachate into the primary aerobic reactor, and subjecting the diluted household waste leachate to an pre-nitrification reaction to obtain a reactant; introducing the reactant into the secondary aerobic reactor, and subjecting the reactant to a main nitrification reaction to convert ammonia nitrogen into nitrate nitrogen and nitrite nitrogen by nitrification of nitrobacteria; refluxing the nitrification liquid to the primary anoxic reactor, converting the nitrate nitrogen and nitrite nitrogen into nitrogen gas by denitrobacteria in the primary anoxic reactor, and discharging the nitrogen gas into atmosphere, thereby finishing an denitrification process.

4 Claims, 1 Drawing Sheet

(51) Int. Cl.
*C02F 3/34* (2023.01)
*C02F 11/12* (2019.01)
*C02F 101/38* (2006.01)
*C02F 103/06* (2006.01)

(52) U.S. Cl.
CPC .............. *C02F 3/302* (2013.01); *C02F 11/12* (2013.01); *C02F 2101/38* (2013.01); *C02F 2103/06* (2013.01); *C02F 2203/006* (2013.01); *C02F 2209/22* (2013.01); *Y02W 10/10* (2015.05)

(58) Field of Classification Search
CPC .............. C02F 2101/38; C02F 2103/06; C02F 2203/006; C02F 2209/22; Y02W 10/10
USPC ........ 210/605, 610, 611, 622, 623, 630, 903
See application file for complete search history.

(56) References Cited

OTHER PUBLICATIONS

Machine-generated English translation of CN 109052827, generated on Jan. 20, 2025.*
Machine-generated English translation of 111018234, generated on Jan. 20, 2025.*
Machine-generated English translation of CN 111138044, generated on Jan. 20, 2025.*
Applicant has no Information to Disclose: No patent novelty search was performed in this case and neither the Applicant nor the undersigned are aware of any prior art devices or documents which they believe to be material to the invention as claimed. This document is being supplied for informational purposes to the Examiner and is evidence of our desire to comply with the duty of disclosure.

* cited by examiner

METHOD FOR DEEP TREATMENT OF HOUSEHOLD WASTE LEACHATE BY BIOCHEMICAL PROCESS

CROSS REFERENCE TO RELATED APPLICATION

This application claims the benefit and priority of Chinese Patent Application No. 202110734977.6 filed on Jul. 1, 2021, the disclosure of which is incorporated by reference herein in its entirety as part of the present application.

TECHNICAL FIELD

The present disclosure relates to waste leachate treatment in the technical field of environmental protection, in particular to a method for deep treatment of household waste leachate by a biochemical process.

BACKGROUND ART

Household waste leachate treatment system includes a pretreatment, a main treatment, an advanced treatment, and an auxiliary treatment, and the treatment system is shown in FIG. 1. Among them, the pretreatment mostly comprises anoxic biological treatment, coagulation precipitation, deamination and other processes. Membrane bioreactor (MBR) is used in the main treatment. The advanced treatment mainly comprises a membrane treatment, including nanofiltration (NF), reverse osmosis (RO) and the like.

During the process of the advanced treatment, concentrated liquid is produced. The longer the membrane process route, the higher the yield of the concentrated liquid. In general, the yield of the concentrated liquid of NF effluent is within 5% of the total influent, and the yield of the concentrated liquid of RO effluent is within 30% of the total influent.

For the treatment of the concentrated liquid, a recharge method is often adopted by landfill plants, and a back spray method in the incinerator is usually adopted by incineration plants. The concentrated liquid could also be treated by reducing the volume of it, such as secondary RO, mechanical vapor recompression evaporation, and submerged combustion evaporation.

In the above treatment of the concentrated liquid, there are the following shortcomings:

1. The recharge of the concentrated liquid would increase the salinity and conductivity of the leachate in regulating tanks, thereby affecting the stable operation of the system.

2. The back spray in the incinerator is greatly affected by the operating conditions of the incinerator, and if the concentrated liquid is too much, the incinerator can not handled it all.

3. The process of secondary RO has a large investment in the early stage and high operating costs, and results in a large amount of concentrated liquid.

4. The processes of the mechanical vapor recompression evaporation and the submerged combustion evaporation have a large investment in the early stage, high operating costs, and a bottleneck in technology.

In view of this, those skilled in the art devote themselves to researching and developing an improved method for treating household waste leachate to overcome the shortcomings existing in the treatment of concentrated liquid.

SUMMARY

The present disclosure is to provide a method for deep treatment of household waste leachate by a biochemical process. Through a deep biochemical process, the method results in a reduced amount of leachate effluent pollutants, a small fluctuations in effluent quality, and a less amount of concentrated liquid, and has a less investment in facilities and equipment, so as to overcome the above-mentioned shortcomings in the prior art.

The present disclosure provides the following technical solutions:

A method for deep treatment of household waste leachate by a biochemical process, comprising:
- arranging one anoxic tank and two aerobic tanks in series, wherein three tanks are respectively set as a primary anoxic reactor, a primary aerobic reactor and a secondary aerobic reactor;
- introducing the household waste leachate into the primary anoxic reactor, and diluting the household waste leachate to an concentration acceptable to microorganisms; then introducing the diluted household waste leachate into the primary aerobic reactor, and subjecting the diluted household waste leachate to an pre-nitrification reaction to obtain a reactant; and introducing the reactant into the secondary aerobic reactor, and subjecting the reactant to a main nitrification reaction to convert ammonia nitrogen into nitrate nitrogen and nitrite nitrogen by nitrification of nitrobacteria, to obtain a nitrification liquid, wherein the household waste leachate is gradually introduced from the primary anoxic tank to the secondary aerobic tank by way of overflow; and
- refluxing the nitrification liquid, i.e. the nitrate nitrogen and nitrite nitrogen, to the primary anoxic reactor through a reflux pipeline after the nitrification reaction, converting the nitrate nitrogen and nitrite nitrogen into nitrogen gas by denitrobacteria in the primary anoxic reactor, and discharging the nitrogen gas into atmosphere, thereby finishing an denitrification process, wherein
- in the method, carbon source is consumed by the denitrobacteria in the primary anoxic tank during the denitrification process, and provides basic energy for the denitrification reaction; an amount of the carbon source is determined according to a ratio of C to N in an influent i.e. a mixture of household waste leachate and refluxed nitrification liquid introducing the primary anoxic tank, an amount of the influent and concentration of the carbon source; in general, the ratio of C to N after carbon source adjustment is in the range of 6-8;
- reactions performed in both the primary aerobic reactor and secondary aerobic reactor are nitrification reaction; during the nitrification reaction, oxygen is needed and provided by an aeration device, an aeration air volume of which is determined by the amount of oxygen dissolved in the household waste leachate; an amount of the oxygen dissolved in the household waste leachate during the nitrification reaction is in the range of 0-2 mg/L in the primary aerobic reactor, and 0-4 mg/L in the secondary aerobic reactor;
- the secondary aerobic reactor is externally connected with a built-in ultrafiltration unit, and residual nitrification liquid after refluxing to the primary anoxic reactor is introduced into the ultrafiltration unit, and stirred by introducing air to achieve a separation of sludge and supernate;
- the resulting mixture after the separation of sludge and supernate is introduced into a remaining sludge system, wherein a part of the sludge is refluxed to a front end to supplement sludge to ensure the sludge concentration in tanks, and the excess sludge is discharged from the system to a sludge tank for dewatering treatment.

In some embodiments, the built-in ultrafiltration unit is composed of a membrane tank, a built-in ultrafiltration membrane, a membrane suction device, a membrane cleaning device, an aeration device, and a power device. The residual nitrification liquid after refluxing to the primary anoxic reactor stirred by air is contacted with the built-in ultrafiltration membrane, and the membrane suction device is started to generate negative pressure in a membrane pipeline, so that the residual nitrification liquid after refluxing to the primary anoxic reactor enters a membrane pipeline having small aperture, and the sludge and particles are trapped outside the membrane pipeline, thereby realizing the separation of sludge and supernate.

In some embodiments, the nitrification liquid is refluxed, i.e. the nitrate nitrogen and nitrite nitrogen are refluxed to the anoxic tank for denitrification at a reflux amount, and the reflux amount is determined according to an influent (i.e. a mixture of household waste leachate and refluxed nitrification liquid introducing the primary anoxic tank) amount. In general, a reflux ratio is a ratio of the reflux amount to the influent amount, and is usually controlled in the range of 15-20.

In some embodiments, the aeration device is a blast aeration device.

In some embodiments, the aeration device is a jet aeration device.

In the method for deep treatment of the household waste leachate by a biochemical process according to the present disclosure, a deep biochemical process is used to reduce the amount of leachate effluent pollutants. Under a condition of a higher drainage standard, the method according to the present disclosure has the following advantages: small investment in facilities and equipment, low operating costs including water, electricity, chemical materials, maintenance and labor costs, stable system operation, and small fluctuations in effluent quality. Under a condition of a same drainage standard, the method according to the present disclosure would not produce too much concentrated liquid.

DETAILED DESCRIPTION OF THE EMBODIMENTS

The present disclosure will be described in detail below with reference to the drawings and embodiments.

Figure 1:
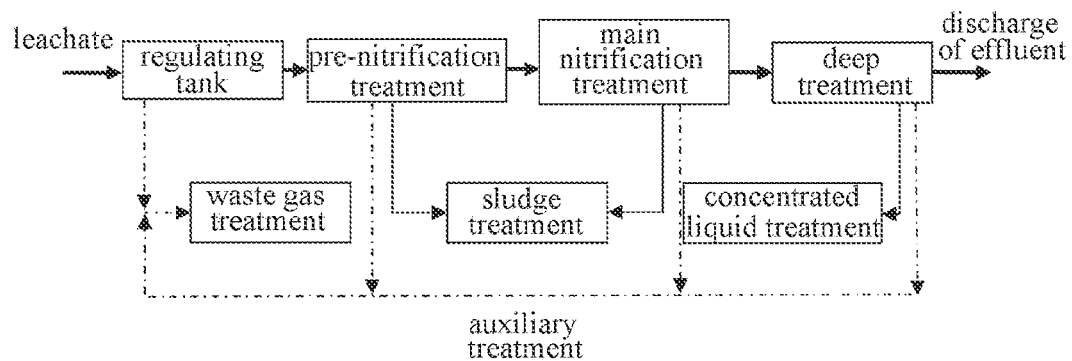
FIG. 1 is a flow chart of a traditional method for treatment of household waste leachate.
Figure 2:
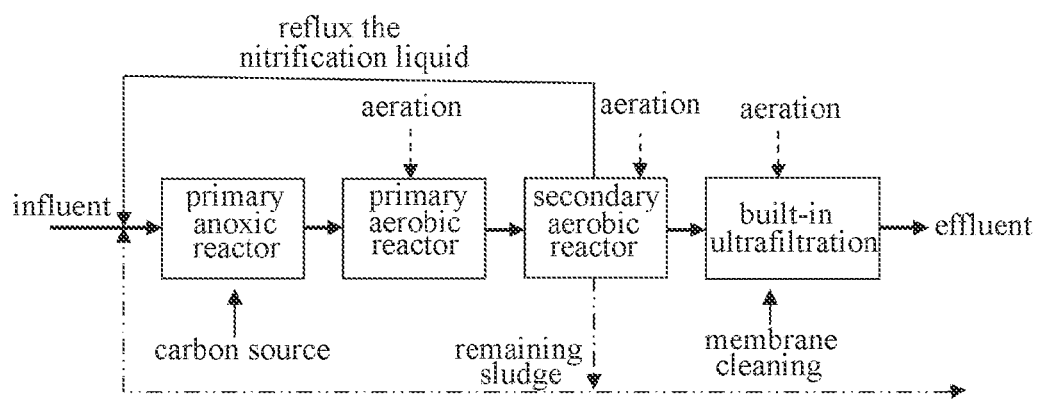
FIG. 2 is a flow chart of the method for deep treatment of household waste leachate by a biochemical process according to one or more embodiments of the present disclosure.

Referring to FIG. 2, the present disclosure provides a method for deep treatment of household waste leachate by a biochemical process, comprising:
arranging one anoxic tank and two aerobic tanks in series, wherein three tanks are respectively set as a primary anoxic reactor, a primary aerobic reactor and a secondary aerobic reactor;
introducing the household waste leachate into the primary anoxic reactor, diluting the household waste leachate to an concentration acceptable to microorganisms; then introducing the diluted household waste leachate into the primary aerobic reactor, and subjecting the diluted household waste leachate to an pre-nitrification reaction to obtain a reactant; and introducing the reactant into the secondary aerobic reactor, and subjecting the reactant to a main nitrification reaction to convert ammonia nitrogen into nitrate nitrogen and nitrite nitrogen by nitrification of nitrobacteria, to obtain a nitrification liquid, wherein the household waste leachate is gradually introduced from the primary anoxic tank to the secondary aerobic tank by way of overflow; and
refluxing the nitrification liquid, i.e. the nitrate nitrogen and nitrite nitrogen, to the primary anoxic reactor through a reflux pipeline, converting the nitrate nitrogen and nitrite nitrogen into nitrogen gas by denitrobacteria in the primary anoxic reactor, and discharging the nitrogen gas into atmosphere, thereby finishing an entire denitrification process.

The nitrification liquid is refluxed, i.e. the nitrate nitrogen and nitrite nitrogen are refluxed to the anoxic tank for denitrification at a reflux amount which is determined according to an influent (i.e. a mixture of household waste leachate and refluxed nitrification liquid introducing the primary anoxic tank) amount. In general, a reflux ratio is a ratio of the reflux amount to the influent amount, and is usually controlled in the range of 15-20.

In the method, carbon source is consumed by the denitrobacteria in the primary anoxic tank during the denitrification process, and provides basic energy for the denitrification reaction. An amount of the carbon source is determined according to a ratio of C to N in an influent (i.e. a mixture of household waste leachate and refluxed nitrification liquid introducing the primary anoxic tank), an amount of the influent and a concentration of the carbon source. In general, the ratio of C to N after carbon source adjustment is in the range of 6-8.

The reactions performed in both the primary aerobic reactor and secondary aerobic reactor are nitrification reaction. During the nitrification reaction, oxygen is needed and provided by an aeration device. There are many forms of aeration. The aeration device commonly used for leachate is a jet aeration device, which has the advantages of high utilization efficiency, good aeration effect, and maintenance free equipment. The aeration air volume is determined by an amount of oxygen dissolved in the household waste leachate. The amount of oxygen dissolved in the household waste leachate during the nitrification reaction is in the range of 0-2 mg/L in the primary aerobic reactor, and 0-4 mg/L in the secondary aerobic reactor.

The secondary aerobic reactor is externally connected with a built-in ultrafiltration unit. The residual nitrification liquid after refluxing to the primary anoxic reactor is introduced into the ultrafiltration unit, and stirred by introducing air to achieve a separation of sludge and supernate.

The built-in ultrafiltration unit is composed of a membrane tank, a built-in ultrafiltration membrane, a membrane suction device, a membrane cleaning device, an aeration device, and a power device. After the residual nitrification liquid after refluxing to the primary anoxic reactor is introduced into the membrane tank, it is stirred by introducing air to make the sludge not sink, not adhere to pipeline wall, and not block membrane pipeline, while keeping the sludge active. The residual nitrification liquid after refluxing to the primary anoxic reactor stirred by air is contacted with the built-in ultrafiltration membrane, and the membrane suction device is started to generate negative pressure in the membrane pipeline, so that the residual nitrification liquid after refluxing to the primary anoxic reactor enters the membrane pipeline, and the sludge and particles are trapped outside the pipeline owing to the small-pore of the membrane pipeline, thereby realizing the separation of sludge and supernate. After the built-in ultrafiltration membrane runs for a period of time, the membrane pipeline is easy to be blocked, so it is necessary to clean the membrane pipeline in time according to the water production of an operating press.

The mixture after the separation of sludge and supernate is introduced into a remaining sludge system, wherein a part of the sludge is refluxed to the front end to supplement sludge to ensure the sludge concentration in tanks, and the excess sludge is discharged from the system to a sludge tank for dewatering treatment.

EXAMPLE

The method for deep treatment of household waste leachate by a biochemical process of the present disclosure was tested and run in the 500T emergency treatment station in Shanghai Laogang, China. The existing method was "regulation tank+MBR+NF", and the effluent indicator reached the standard in Table 2 of "Emission Standards for Pollutants from Household Waste Landfills" (GB16889-2008). The emission standards in Table 2 are as follows:

| Indicators | Emission standard concentration limit |
|---|---|
| $COD_{Cr}$ (mg/L) | 100 |
| TN (mg/L) | 40 |
| $NH_4^+$—N (mg/L) | 25 |

The method after technological improvement was "regulation tank+MBR+$AO_2$ (anoxic-aerobic-biological contact oxidation process)+built-in ultrafiltration+NF". The effluent indicators of the two methods are as follows:

| Indicators | The average data of the method before technological improvement (mg/L) | The average data of the method after technological improvement (mg/L) | Decrease rate |
|---|---|---|---|
| COD | 150 | 50 | 67% |
| Ammonia nitrogen | 2 | 1 | 50% |
| Total nitrogen | 19 | 9 | 53% |

According to the treatment process for leachate, the effluent from MBR has similar quality to that of the influent for the municipal sewage treatment plant. In the present method, the effluent from MBR is introduced into a primary AO2 system, and then is separated into sludge and supernate by the built-in ultrafiltration membrane. The supernate is subjected to the subsequent processing. In the method, the sludge concentration is controlled in the range of 5-8 g/L, the influent COD concentration is controlled to be 2500 mg/L or lower, the TN concentration is controlled to be 200 mg/L or lower, and related parameters such as dissolved oxygen, temperature, pH, and reflux ratio are all referenced to the existing method.

Compared with the existing method, the technical indicators obtained by the method for deep treatment of household waste leachate by a biochemical process according to the present disclosure are as follows: the COD of the leachate subjected to nanofiltration membrane is decreased by 67%, the ammonia nitrogen is decreased by 50%, and the total nitrogen is decreased by 53%.

In summary, the method for deep treatment of household waste leachate by a biochemical process according to the present disclosure results in a reduced amount of leachate effluent pollutants through a deep biochemical process. Under a condition of a higher drainage standard, the method according to the present disclosure has the following advantages: small investment in facilities and equipment, low operating costs including water, electricity, chemical materials, maintenance and labor costs, stable system operation, and small fluctuations in effluent quality. Under a condition of the same drainage standard, the method according to the present disclosure would not produce too much concentrated liquid.

Of course, those skilled in the art should recognize that the above-mentioned embodiments are only used to illustrate the present disclosure, but not to limit the present disclosure. Changes and modifications to the above embodiments should fall within the scope as defined by the claims of the present disclosure, as long as they are within the substantive spirit of the present disclosure.

What is claimed is:

1. A method for deep treatment of household waste leachate by a biochemical process, comprising:
   arranging one anoxic tank and two aerobic tanks in series, wherein three tanks are respectively set as a primary anoxic reactor, a primary aerobic reactor and a secondary aerobic reactor;
   introducing the household waste leachate into the primary anoxic reactor, diluting the household waste leachate to an concentration acceptable to microorganisms; then introducing the diluted household waste leachate into the primary aerobic reactor, and subjecting the diluted household waste leachate to a pre-nitrification reaction to obtain a reactant; and introducing the reactant into the secondary aerobic reactor, and subjecting the reactant to a main nitrification reaction to convert ammonia nitrogen into nitrate nitrogen and nitrite nitrogen by nitrification of nitrobacteria, to obtain a nitrification liquid, wherein the household waste leachate is gradually introduced from the primary anoxic reactor to the secondary aerobic reactor by way of overflow; and
   refluxing the nitrification liquid comprising the nitrate nitrogen and the nitrite nitrogen to the primary anoxic reactor through a reflux pipeline, converting the nitrate nitrogen and the nitrite nitrogen into nitrogen gas by denitrobacteria in the primary anoxic reactor, and discharging the nitrogen gas into atmosphere, thereby finishing a denitrification process,
   wherein, a carbon source is consumed by the denitrobacteria in the primary anoxic reactor, and provides basic energy for the denitrification process, and an amount of the carbon source is determined according to a ratio of C to N in an influent, an amount of the influent and a concentration of the carbon source; and the ratio of C to N after carbon source adjustment is in a range of 6-8;
   reactions performed in both the primary aerobic reactor and secondary aerobic reactor are nitrification reactions; during the nitrification reactions, oxygen is needed and provided by an aeration device, and an aeration air volume of the aeration device is determined by an amount of dissolved oxygen in the household waste leachate; the amounts of the dissolved oxygen in the household waste leachate during the nitrification reactions are in a range of 0-2 mg/L in the primary aerobic reactor, and 0-4 mg/L in the secondary aerobic reactor;
   the secondary aerobic reactor is externally connected with a built-in ultrafiltration unit; a residual nitrification liquid after refluxing to the primary anoxic reactor is introduced into the built-in ultrafiltration unit, and stirred by introducing air to achieve a separation of sludge and supernate; and a resulting mixture after the separation of sludge and supernate is introduced into a remaining sludge system, wherein a part of the sludge is refluxed to a front end to supplement sludge to ensure sludge concentration in tanks, and excess sludge is discharged from the remaining sludge system to a sludge tank for dewatering treatment.

2. The method of claim 1, wherein the built-in ultrafiltration unit is composed of a membrane tank, a built-in ultrafiltration membrane, a membrane suction device, a membrane cleaning device, an aeration device, and a power device; and the residual nitrification liquid after refluxing to the primary anoxic reactor stirred by air is contacted with the built-in ultrafiltration membrane, and the membrane suction device is started to generate negative pressure in a membrane pipeline having an aperture, so that the residual nitrification liquid after refluxing to the primary anoxic reactor is introduced into the membrane pipeline having the aperture, and sludge and particles are trapped outside the membrane pipeline, thereby realizing the separation of sludge and supernate.

3. The method of claim 1, wherein the nitrification liquid comprising the nitrate nitrogen and the nitrite nitrogen is refluxed to the primary anoxic reactor for denitrification; a reflux amount is determined according to an influent amount, and a reflux ratio is a ratio of the reflux amount to the influent amount, and is controlled in the range of 15-20.

4. The method of claim 1, wherein the aeration device is a jet aeration device.

* * * * *